US012757306B2

(12) United States Patent

Guo et al.

(10) Patent No.: US 12,757,306 B2

(45) Date of Patent: *Oct. 6, 2026

(54) FOUR WIRE-TO-TWO WIRE LAMP CONTROL SYSTEM AND METHOD

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 36 days.

This patent is subject to a terminal disclaimer.

(21) Appl. No.: 18/898,730

(22) Filed: Sep. 27, 2024

(65) Prior Publication Data

US 2026/0006704 A1 Jan. 1, 2026

(30) Foreign Application Priority Data

Jun. 28, 2024 (CN) ........................ 202410858211.2

(51) Int. Cl.
*H05B 47/185* (2020.01)
*H05B 45/20* (2020.01)

(52) U.S. Cl.
CPC ........... *H05B 47/185* (2020.01); *H05B 45/20* (2020.01)

(58) Field of Classification Search
CPC ............................. H05B 47/185; H05B 45/20
USPC ......................................................... 370/12.1
See application file for complete search history.

(56) References Cited

U.S. PATENT DOCUMENTS 5,402,148 A * 3/1995 Post ....................... A61B 5/339 345/698
5,563,654 A * 10/1996 Song ...................... H04N 23/88 348/225.1
6,259,484 B1 * 7/2001 Jiang ...................... H04N 21/47 348/747
6,556,249 B1 * 4/2003 Taylor ...................... H04N 9/83 386/E9.029
7,689,130 B2 * 3/2010 Ashdown ............. H04B 10/116 398/118
8,395,328 B2 * 3/2013 Quick ...................... G09G 3/14 315/312
2002/0033898 A1 * 3/2002 Dumont ............. H04N 5/44504 348/E5.1

(Continued)

*Primary Examiner* — Zhen Y Wu

(74) *Attorney, Agent, or Firm* — Frank Niranjan

(57) ABSTRACT

A four wire-to-two wire lamp control method includes: inputting R, G and B lamp control signals are to corresponding oscillators which are controlled to generate R, G and B oscillation signals; the three oscillation signals being amplified and then coupled into a composite signal which is superposed onto integrated electric power to obtain composite electric power that is transmitted by a two-wire system transmission module. In this way, transformation from a four-wire lamp system to a two-wire lamp system is realized. The composite signal and power are synchronously transmitted in the two-wire system, such that the system can approximately synchronously transmit the composite signal at a low delay, and the integrated electric power can still be transmitted continuously in case of a low duty cycle of the lamp control signals, thus satisfying the requirement for driving power of a lamp.

6 Claims, 4 Drawing Sheets

(56) References Cited

U.S. PATENT DOCUMENTS

| | | | | |
|---|---|---|---|---|
| 2004/0189589 | A1* | 9/2004 | Park | G03B 33/12 348/E9.026 |
| 2006/0239689 | A1* | 10/2006 | Ashdown | H04B 10/1141 398/130 |
| 2010/0102734 | A1* | 4/2010 | Quick | H05B 47/18 315/312 |
| 2013/0076803 | A1* | 3/2013 | Lee | G09G 3/3233 345/82 |
| 2013/0234619 | A1* | 9/2013 | Sempel | H05B 45/20 315/297 |
| 2014/0232755 | A1* | 8/2014 | Wang | G09G 3/20 345/212 |
| 2017/0354022 | A1* | 12/2017 | Dimberg | H05B 45/20 |
| 2020/0193908 | A1* | 6/2020 | Liu | G09G 3/3258 |
| 2020/0404227 | A1* | 12/2020 | Chang | H04N 9/3105 |
| 2023/0049359 | A1* | 2/2023 | Zou | H05B 45/355 |

* cited by examiner

FOUR WIRE-TO-TWO WIRE LAMP CONTROL SYSTEM AND METHOD

FIELD

The invention relates to the technical field of lamp control signal transmission, in particular to a four wire-to-two wire lamp control system and method.

BACKGROUND

At present, two-wire lamp systems are well-received in the field of lamp control because they have a simple circuit design, a few wires and a low cost and are easy to install and maintain, thus gradually replacing original four-wire lamp systems. Considering that four-wire lamp systems are widely used in the past, for the sake of lower costs, the four-wire systems are often transformed into two-wire systems to reduce wiring and maintenance costs.

When an existing four-wire lamp system is transformed into a two-wire lamp system, lamp control signals of the four-wire lamp system in a complete period need to be sampled and then converted into coded signals, which are then input to the two-wire lamp system to be transmitted, such that transformation from the four-wire system to the two-wire system is realized. However, this scheme not only has high requirements for sampling accuracy and stability, but also easily causes a failure to drive a lamp due to signal transmission errors caused by the lack of power transmission of the system during two-wire signal transmission in a case where lamp control signals remain at a low duty cycle for an excessively long time.

SUMMARY

To solve the technical problem of signal transmission errors caused by the lack of power of a system when lamp control signals in a complete period are sampled and converted into coded signals to be transmitted in a case where a four-wire lamp system is transformed into a two-wire lamp system in the prior art, the invention provides a four wire-to-two wire lamp control system and method.

In one aspect, the present invention provides a four wire-to-two wire lamp control method, comprising: S1: inputting R (red), G (green) and B (blue) lamp control signals in a four-wire system to three corresponding oscillators respectively, and controlling the oscillators to generate R, G and B oscillation signals respectively, wherein oscillation frequencies of the three oscillators are different and are all higher than frequencies of the input R, G or B lamp control signals; S2: amplifying the R, G and B oscillation signals to obtain amplified R, G and B oscillation signals which are coupled into a composite signal to be input; S3: integrating electric power of the three lamp control signals in the four-wire system with electric power of a driving circuit to obtain integrated electric power; S4: superposing the composite signal onto the integrated electric power to obtain composite electric power that is transmitted by a two-wire system; S5: receiving the composite electric power from the two-wire system, and performing signal-power separation on the composite electric power to obtain driving power for driving a lamp, and the composite signal; S6: enabling the composite signal to sequentially pass through three LC frequency selection circuits for frequency selection to restore the composite signal into the amplified R, G and B oscillation signals; and S7: demodulating the amplified R, G and B oscillation signals to obtain the R, G and B lamp control signals respectively for controlling a corresponding R-LED lamp bank, G-LED lamp bank or B-LED lamp bank in the lamp. The preset frequency selection ranges of the three LC frequency selection circuits match the frequencies of the oscillators respectively.

Preferably, in S2, the R, G and B oscillation signals are coupled by capacitive coupling or transformer coupling.

Preferably, before S1, the four wire-to-two wire lamp control method further comprises S0: respectively detecting states of the R, G and B lamp control signals input to the three corresponding oscillators from the four-wire system, and controlling the oscillators to which the R, G and B lamp control signals are input to start to oscillate or stop oscillating based on the states of the R, G and B lamp control signals.

In another aspect, the present invention provides a four wire-to-two wire lamp control system which comprises a four-wire system input module, an oscillation starting and stopping module, a power integration module, a signal coupling module, a signal superposition module, a two-wire system transmission module and an analysis module. The four-wire system input module is connected to an input terminal of the power integration module by means of a first positive wire, an R signal wire, a G signal wire and a B signal wire; an output terminal of the power integration module is sequentially connected to the signal superposition module and the two-wire system transmission module by means of a second first positive wire and a first negative wire; a composite output terminal of the two-wire system transmission module is connected to a composite input terminal of the analysis module by means of a signal wire and a second negative wire, a composite output terminal of the analysis module is connected to a lamp. The oscillation starting and stopping module comprises three oscillators, input terminals of the three oscillators are connected to the R signal wire, the G signal wire and the B signal wire respectively, output terminals of the three oscillators are all connected to the signal coupling module, and an output terminal of the signal coupling module is connected to the signal superposition module; the four-wire system input module is configured for generating R (red), G (green) and B (blue) lamp control signals and outputting the R, G and B lamp control signals to corresponding oscillators by means of the R signal wire, the G signal wire and the B signal wire respectively; the oscillators are configured for correspondingly receiving the R, G and B lamp control signals and generating R, G and B oscillation signals, wherein oscillation frequencies of the three oscillators are different and are all higher than frequencies of the input R, G or B lamp control signals; the signal coupling module is configured for coupling the three oscillation signals into a composite signal and transmitting the composite signal to the signal superposition module; the power integration module is configured for integrating power of the R, G and B lamp control signals with power of a driving circuit to obtain integrated electric power; the signal superposition module is configured for superposing the composite signal onto the integrated electric power to obtain composite electric power and outputting the composite electric power to the two-wire system transmission module; the two-wire system transmission module comprises a third positive wire connected to the second positive wire and a third negative wire connected to the first negative wire, and is configured for transmitting the composite electric power and outputting the composite electric power to the analysis module; the analysis module comprises a signal-power separation unit, a frequency selection circuit unit and a demodulation unit; the signal-power separation unit is configured for receiving the composite electric power and performing signal-power separation on the composite electric power to obtain driving power for driving a lamp, and the composite signal; the frequency selection circuit unit comprises three LC frequency selection circuits corresponding to the oscillators, the demodulation unit comprises three demodulators, the lamp comprises an R-LED lamp bank, a G-LED lamp bank and a B-LED lamp bank, the three LC frequency selection circuits are connected in sequence, and output terminals of the three LC frequency selection circuits are electrically connected to the R-LED lamp bank, the G-LED lamp bank and the B-LED lamp bank by means of the demodulators respectively; and the composite signal sequentially passes through the three LC frequency selection circuits for frequency selection such that the composite signal are restored to the R, G and B oscillation signals; the demodulators are configured to demodulate the R, G and B oscillation signals input thereto to extract the R, G and B lamp control signals to control the corresponding R-LED lamp bank, the G-LED lamp bank or the B-LED lamp bank; wherein preset frequency selection ranges of the three LC frequency selection circuits match the frequencies of the oscillators respectively.

Preferably, the four wire-to-two wire lamp control system further comprises a signal amplification module, wherein the signal amplification module comprises three signal amplifiers, input terminals of the signal amplifiers are respectively connected to the oscillators in one-to-one correspondence, and output terminals of the signal amplifiers are all connected to an input terminal of the signal coupling module.

Preferably, the oscillation starting and stopping module further comprises an MCU and switching devices in one-to-one correspondence with the oscillators, input terminals of the MCU are connected to the R signal wire, the G signal wire and the B signal wire respectively, and output terminals of the MCU are connected to the switching devices in one-to-one correspondence; the input terminals of the three oscillators are connected to the R signal wire, the G signal wire and the B signal wire in one-to-one correspondence by means of the switching devices respectively; and the MCU is configured to detect whether the R, G and B lamp control signals are output by the R signal wire, the G signal wire and the B signal wire and control the switching devices to be turned on or off according to detection results to thereby control the oscillators to start to oscillate or stop oscillating.

Preferably, the signal superposition module comprises a triode, a resistor A, a resistor B, a MOS transistor, a diode a, a diode b and a resistor C, a base of the triode is sequentially connected to the resistor A and an output terminal of a sampling MCU, an emitter of the triode is grounded, a collector of the triode is connected to the resistor B, the diode a is connected in series to the diode b and then connected in parallel to the MOS transistor, and the resistor C is connected between a drain and a gate of the MOS transistor and connected to the output terminal of the power integration module; and the gate of the MOS transistor is connected to a terminal of the resistor B, and a source of the MOS transistor is connected to an input terminal of the two-wire system transmission module.

The invention has the following beneficial effects: according to the four wire-to-two wire lamp control method provided by the invention, R, G and B lamp control signals are respectively input to corresponding oscillators, and the oscillators are controlled to generate R, G and B oscillation signals respectively; the three oscillation signals are amplified and then coupled into a composite signal, the composite signal is superposed onto integrated electric power to obtain composite electric power, and the composite electric power is transmitted by a two-wire system. In this way, system transformation from a four-wire system to a two-wire system is realized, it is ensured that the composite signal and power are synchronously transmitted in the two-wire system, such that the system can approximately synchronously transmit the composite signal at a low delay, and the integrated electric power can still be transmitted continuously in case of a low duty cycle of the lamp control signals, thus satisfying the requirement for driving power of a lamp and solving the problem that the lamp fails to be driven due to the lack of power of the system during two-wire signal transmission in case of a low duty cycle of the lamp control signals.

According to the four wire-to-two wire lamp control system provided by the invention, R, G and B lamp control signals are input to three oscillators at different frequencies to generate three oscillation signals which are amplified and then coupled into a composite signal by a signal coupling module, power of the three lamp control signals in a four-wire system input module and driving power are integrated into composite electric power by a power integration module, the integrated electric power and coded signals are superposed by a signal superposition module to form composite electric power that is output to an analysis module by a two-wire system transmission module, and finally, the analysis module analyzes the composite electric power to control and drive a lamp. In this way, transformation from a four-wire lamp system to a two-wire lamp system is realized, the structure of the system is simplified, and the number of wires and the wiring complexity are reduced; moreover, the system can approximately synchronously transmit the composite signal at a low delay, and the integrated electric power can still be transmitted continuously in case of a low duty cycle of the lamp control signals, thus satisfying the requirement for driving power of the lamp and reducing the cost and maintenance difficulty of the system.

REFERENCE SIGNS

1, four-wire system input module; 2, oscillation starting and stopping module; 21, oscillator; 22, MCU; 23, switching device; 3, power integration module; 4, signal coupling module; 5, signal superposition module; 6, analysis module; 61, signal-power separation unit; 62, frequency selection circuit unit; 63, demodulation unit; 7, lamp; 8, signal amplification module; 9, two-wire system transmission module.

DESCRIPTION OF THE EMBODIMENTS

The invention is further described below in conjunction with accompanying drawings and specific embodiments. It should be noted that the preferred embodiments described below are merely illustrative ones of the invention, and those skilled in the art can obtain other obvious transformations. The basic principle of the invention defined in the following description may be applied to other implementations, transformations, improvements, equivalents and other technical solutions without departing from the spirit and scope of the invention.

Figure 1:
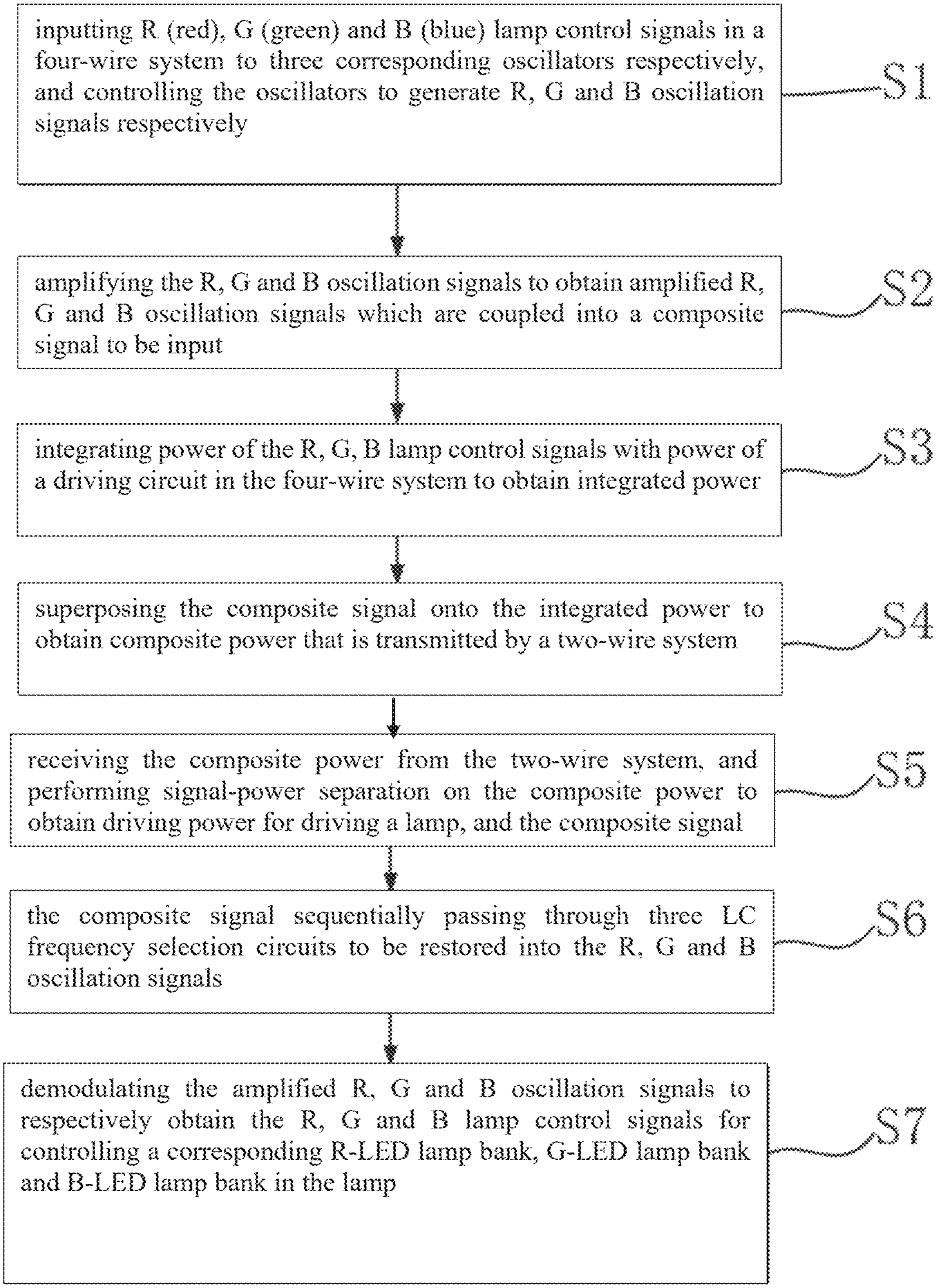
FIG. 1 is a flow diagram of a four wire-to-two wire lamp control method according to the invention.
Figure 2:
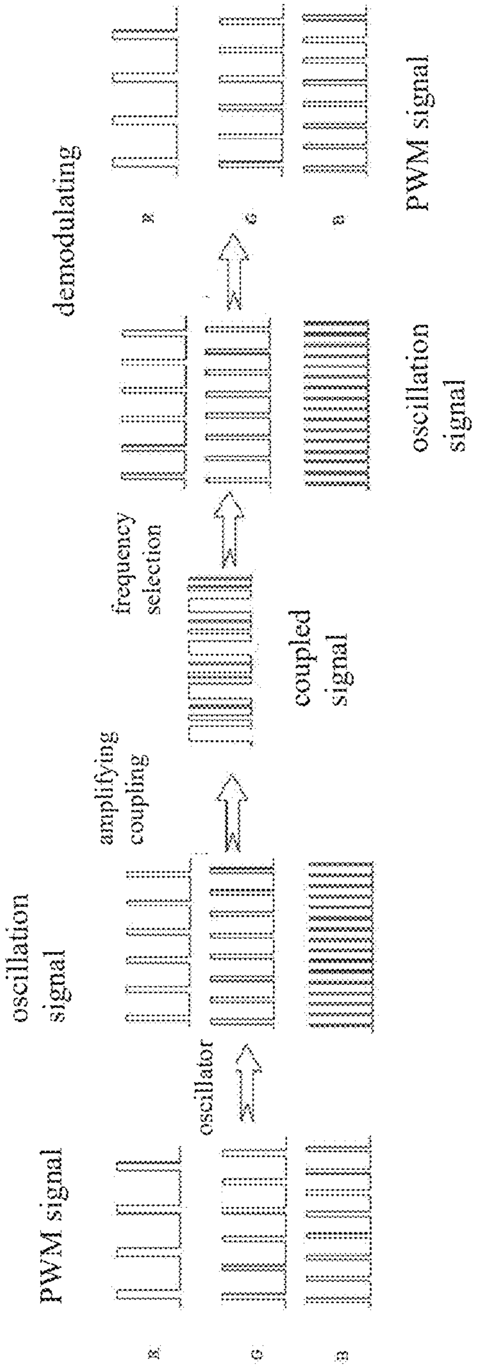
FIG. 2 is a flow diagram of lamp control signal transmission according to one embodiment.

Referring to FIGS. 1 and 2, a four wire-to-two wire lamp control method is suitable for system transformation from a four-wire lamp system to a two-wire lamp system. The method comprises Step S1-Step S7.

Step S1: R (red), G (green) and B (blue) lamp control signals in a four-wire system are respectively input to three corresponding oscillators 21 which are controlled to generate R, G and B oscillation signals respectively, wherein oscillation frequencies of the three oscillators are different and are all higher than the frequency of the input R, G or B lamp control signal. The low-frequency R, G and B lamp control signals are input to the oscillators 21, the corresponding oscillators 21 are controlled to generate high-frequency R, G and B oscillation signals which are less disturbed in the transmission process and can more quickly respond to signal changes.

Step S2: the R, G and B oscillation signals are amplified, the amplified R, G and B oscillation signals are coupled into a composite signal to be output. Step S3: electric power of the three lamp control signals in the four-wire system is integrated with electric power of a driving circuit to obtain integrated electric power. In this embodiment, Step S2 and Step S3 are performed synchronously.

Wherein, by amplifying the oscillation signals, the amplitude and power of the signals can be increased, the signal to noise ratio of the oscillation signals can be increased, the influence of noise on the quality of the oscillation signals can be reduced, and the situation where the signals are distorted or information is lost due to an insufficient amplitude or power in the subsequent processing or transmission process can be avoided. The coupling process not only simplifies signal transmission, but also reduces interference and delays between signals.

Figure 4:
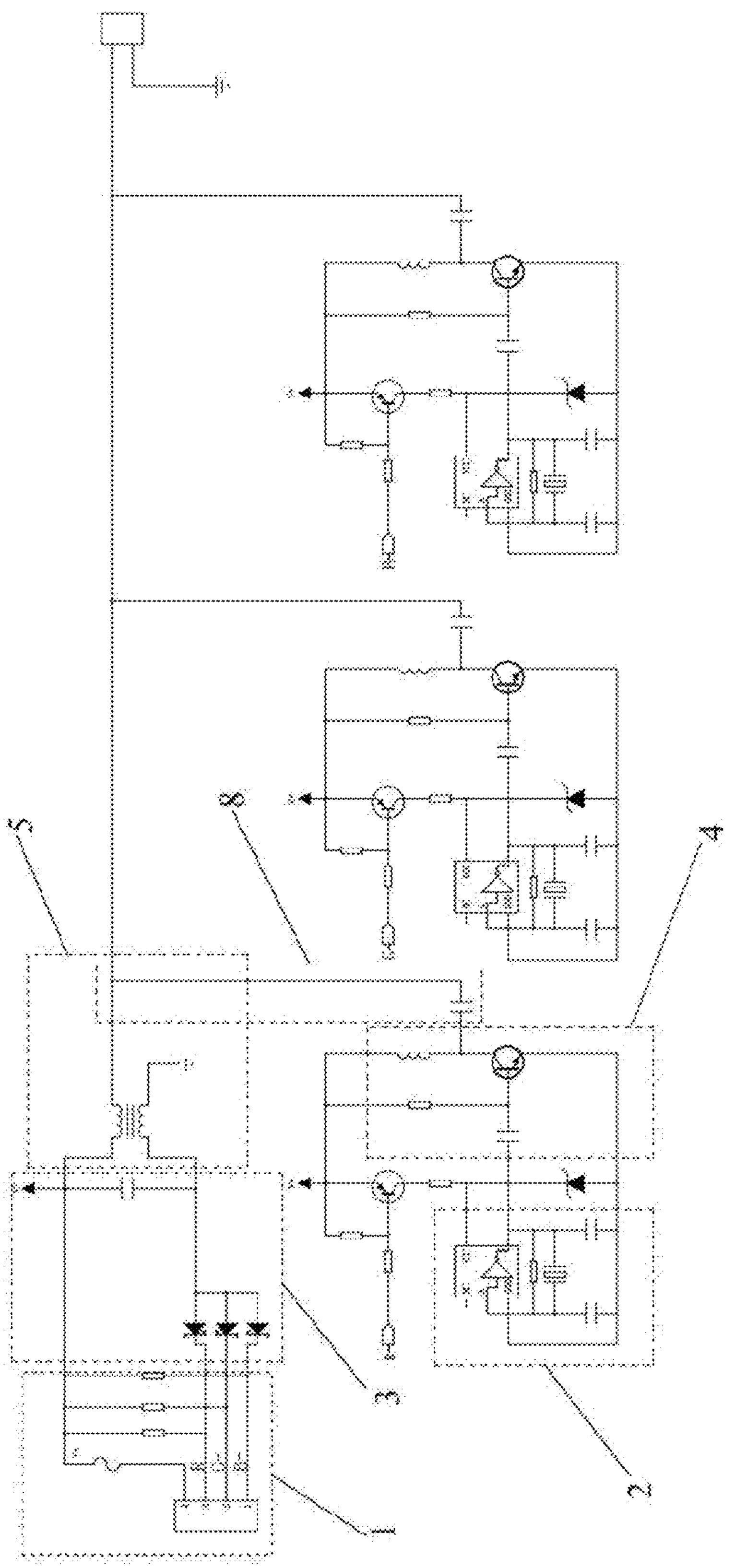
FIG. 4 is a circuit diagram illustrating a four wire system input module, a power integration module, an oscillation starting and stopping module, a power integration module, a signal coupling module, a signal superposition module and other components.

Specifically, the three oscillation signals are coupled by capacitive coupling or transformer coupling. In a case of capacitive coupling, each of the oscillation signal is connected to a common output circuit by means of a capacitor. The capacitor allows alternating current signals to pass through and prevents direct-current signals from flowing through. After being subjected to capacitive coupling, the oscillation signals may be mutually influenced and combined into a composite signal. In a case of transformer coupling, each of the oscillation signals is connected to a common output circuit by means of a transformer. The transformer can realize signal isolation and coupling, and under the mutual inductance of the transformer, oscillation signals at different frequencies on a primary coil can lead to a sensed synthesized signal generated on a secondary coil. Referring to FIG. 4, in the present embodiment, the three RGB oscillation signals are coupled by capacitive coupling.

S4: the composite signal is superposed onto the integrated electric power to obtain composite electric power that is transmitted by a two-wire system. S5: the composite electric power is received from the two-wire system, and signal-power separation is performed on the composite electric power to obtain driving power for driving a lamp 7 and the composite signal.

The R, G and B lamp control signals are respectively input to the corresponding oscillators 21 which are controlled to generate the R, G and B oscillation signals respectively. The three oscillation signals are amplified and then coupled into the composite signal which is superposed on the integrated electric power to obtain the composite electric power that is transmitted by the two-wire system, such that system transformation from the four-wire system to the two-wire system is realized. After signal-power separation is performed on the composite electric power by the two-wire system, the driving power for driving the lamp 7 and the composite signal carrying control information of the lamp 7 are obtained to drive and control the lamp 7.

S6: the composite signal sequentially passes through three LC frequency selection circuits for frequency selection to gradually restore the composite signal into amplified R, G and B oscillation signals. Wherein, preset frequency selection ranges of the three LC frequency selection circuits match the frequencies of the corresponding oscillators 21.

The LC frequency selection circuit selects signals at a specific frequency by means of the resonance characteristics of an inductor and a capacitor. In the LC frequency selection circuit, the impedance of the inductor and the capacitor changes with the change of frequency. When the circuit reaches a resonant state, that is, the frequency of an input signal is equal to the resonant frequency of the circuit, the total impedance of the circuit is minimum, and the signal is transmitted to the maximum extent. In this embodiment, the preset frequency selection ranges of each of the LC frequency selection circuits matches the frequency of the corresponding one of the three oscillators 21. For example, when the preset frequency selection range of the composite signal matches the frequency of the oscillator 21 which generates the R oscillation signal, only a signal at a frequency similar to the frequency of the oscillator 21, which generates the R oscillation signal, in the composite signal will be amplified and transmitted, other frequency components will be restrained. Thus, a signal output by the LC frequency selection circuit is the amplified R oscillation signal.

S7: the amplified R, G and B oscillation signals are demodulated to obtain the R, G and B lamp control signals respectively for controlling the corresponding R-LED lamp bank, G-LED lamp bank and B-LED lamp bank in the lamp 7.

Because the oscillation frequencies of the three oscillators 21 are different and are all higher than the frequency of the input R, G or B lamp control signal, the low-frequency R, G and B lamp control signals can be extracted/selected respectively from the high-frequency R, G and B oscillation signals to thereby restore the R, G and B lamp control signals before being coupled to control the corresponding R-LED lamp bank, G-LED lamp bank or B-LED lamp bank in the lamp 7.

Preferably, in this embodiment, before S1, the four wire-to-two wire lamp control method further comprises S0: states of the R, G and B lamp control signals input to the three corresponding oscillators from the four-wire system are detected respectively, and the oscillators 21 to which the R, G and B lamp control signals are input are correspondingly controlled to oscillate or stop oscillating based on the states of the R, G and B lamp control signals. The states of the three lamp control signals comprise the lamp control signals being input and the lamp control signals being not input.

For example, in a case where the R lamp control signal is not input at present and only the G lamp control signal and the B lamp control signal are input, the oscillator 21 corresponding to the R lamp control signal is in a non-oscillating state, and the other two oscillators 21 are in an oscillating state, G and B lamp oscillation signals are generated, amplified and then coupled into a composite signal, and then the composite signal is transmitted.

Figure 3:
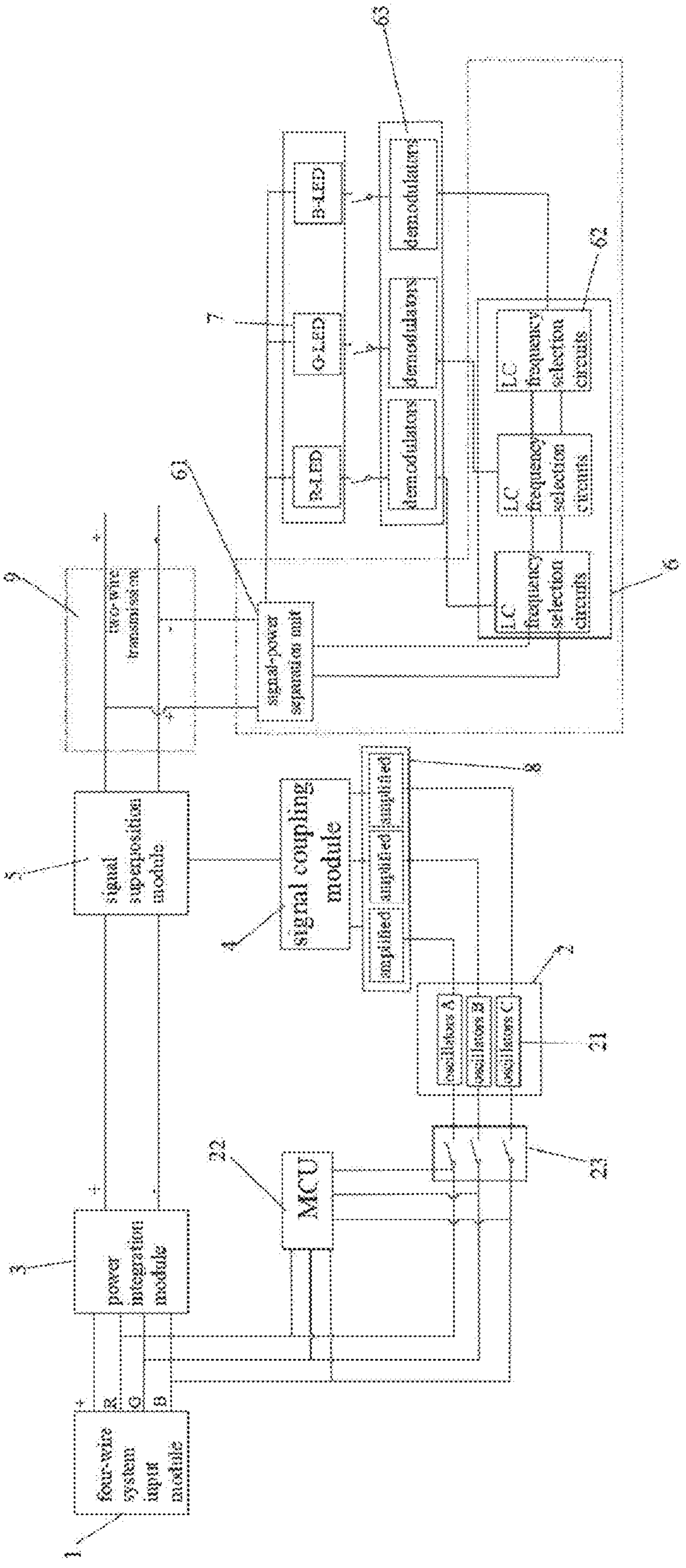
FIG. 3 is a principle diagram of a four wire-to-two wire lamp control system according to the invention.

Referring to FIG. 3 and FIG. 4, the invention further provides a four wire-to-two wire lamp control system, which is suitable for the four wire-to-two wire lamp control method described above and comprises a four-wire system input module 1, an oscillation starting and stopping module 2, a power integration module 3, a signal coupling module 4, a signal superposition module 5, a two-wire system transmission module 9 and an analysis module 6.

The four-wire system input module 1 is connected to an input terminal of the power integration module 3 by means of a first positive wire, an R signal wire, a G signal wire and a B signal wire. An output terminal of the power integration module 3 is sequentially connected to the signal superposition module 5 and the two-wire system transmission module 9 by means of a second first positive wire and a first negative wire. A composite output terminal of the two-wire system transmission module 9 is connected to a composite input terminal of the analysis module 6 by means of a signal wire and a second negative wire, a composite output terminal of the analysis module is connected to a lamp. The oscillation starting and stopping module 2 comprises three oscillators 21, input terminals of the three oscillators 21 are connected to the R signal wire, the G signal wire and the B signal wire respectively, output terminals of the three oscillators 21 are all connected to the signal coupling module 4, and an output terminal of the signal coupling module 4 is connected to the signal superposition module 5.

The four-wire system input module 1 is configured for generating R (red), G (green) and B (blue) lamp control signals and outputting the R, G and B lamp control signals to the corresponding oscillators 21 by means of the R signal wire, the G signal wire and the B signal wire respectively.

The oscillators 21 are configured for correspondingly receiving the R, G and B lamp control signals and generating R, G and B oscillation signals, wherein oscillation frequencies of the three oscillators 21 are different and are all higher than frequencies of the input R, G or B lamp control signals. The R, G and B lamp control signals are input to control the oscillators 21 to correspondingly output high-frequency R, G and B oscillation signals.

The signal coupling module 4 is configured for coupling the three oscillation signals into a composite signal and transmitting the composite signal to the signal superposition module 5.

The power integration module 3 is configured for integrating power of the R, G and B lamp control signals with power of a driving circuit to obtain integrated electric power.

The signal superposition module 5 is configured for superposing the composite signal onto the integrated electric power to obtain composite electric power and outputting the composite electric power to the two-wire system transmission module 9.

The two-wire system transmission module 9 comprises a third positive wire connected to the second first positive wire and a third negative wire connected to the first negative wire, and is configured for transmitting the composite electric power and outputting the composite electric power to the analysis module 6.

The analysis module 6 comprises a signal-power separation unit 61, a frequency selection circuit unit 62 and a demodulation unit 63.

The signal-power separation unit 61 is configured for receiving the composite electric power and performing signal-power separation on the composite electric power to obtain driving power for driving a lamp 7, and the composite signal. The signal-power separation unit 61 may comprise signal-power separation circuit consisted of a filter and a voltage regulator. The composite electric power first undergoes filtering treatment through the filter to remove high-frequency noise and interference signals. The filter divides the composite electric power into a low-frequency part, namely the driving electrical power, and a high-frequency part, namely the composite signal according to the set cutoff frequency. The driving electrical power is stabilized by the voltage regulator before being output to the lamp 7.

The frequency selection circuit unit 62 comprises three LC frequency selection circuits corresponding to the oscillators 21, the demodulation unit 63 comprises three demodulators, and the lamp 7 comprises an R-LED lamp bank, a G-LED lamp bank and a B-LED lamp bank. The three LC frequency selection circuits are connected in sequence, and output terminals of the three LC frequency selection circuits are electrically connected to the R-LED lamp bank, the G-LED lamp bank and the B-LED lamp bank by means of the demodulators respectively.

The composite signal sequentially passes through the three LC frequency selection circuits for frequency selection to gradually restore the composite signal to the R, G and B oscillation signals. The demodulators demodulate the R, G and B oscillation signals to extract/obtain the R, G and B lamp control signals to control the corresponding R-LED lamp bank, the G-LED lamp bank or the B-LED lamp bank. Preset frequency selection ranges of the three LC frequency selection circuits match the frequencies of the corresponding oscillators.

Preferably, the four wire-to-two wire lamp control system further comprises a signal amplification module 8 which comprises three signal amplifiers. Input terminals of the signal amplifiers are respectively connected to the oscillators 21 in one-to-one correspondence, and output terminals of the signal amplifiers are all connected to an input terminal of the signal coupling module 4. The signal amplifiers are configured for amplifying the oscillation signals to increase the amplitude and power of the oscillation signals.

The oscillation starting and stopping module 2 further comprises an MCU 22 and switching devices 23 in one-to-one correspondence with the oscillators 21, input terminals of the MCU 22 are connected to the R signal wire, the G signal wire and the B signal wire respectively, and output terminals of the MCU 22 are connected to the switching devices 23 in one-to-one correspondence; the input terminals of the three oscillators 21 are connected to the R signal wire, the G signal wire and the B signal wire in one-to-one correspondence by means of the corresponding switching devices 23. The MCU 22 is configured to detect whether lamp control signals are output by the R signal wire, the G signal wire and the B signal wire and controls the corresponding switching devices 23 to be turned on or off according to detection results to control the corresponding oscillators 21 to start to oscillate or stop oscillating.

Referring to FIG. 4, the signal superposition module 4 is configured for superposing the composite signal onto the integrated electric power to obtain composite electric power and outputting the composite electric power to the two-wire system transmission module 8.

According to the four wire-to-two wire lamp control system provided by the invention, R, G and B lamp control signals are input to three oscillators 21 at different frequencies to generate three oscillation signals which are amplified and then coupled into a composite signal by the signal coupling module 4, power of the three lamp control signals in the four-wire system input module 1 and driving power are integrated into composite electric power by the power integration module 3, the integrated electric power and coded signals are superposed by the signal superposition module 5 to form composite electric power that is output to the analysis module 6 by the two-wire system transmission module 9, and finally, the analysis module 6 analyzes the composite electric power to control and drive the lamp 7. In this way, transformation from a four-wire lamp system to a two-wire lamp system is realized, the structure of the system is simplified, and the number of wires and the wiring complexity are reduced; moreover, the system can approximately synchronously transmit a composite signal at a low delay, and the integrated electric power can still be transmitted continuously in case of a low duty cycle of the lamp control signals, thus satisfying the requirement for driving power of the lamp 7 and reducing the cost and maintenance difficulty of the system.

Those skilled in the art should understand that the embodiments described above and shown in the accompanying drawings are merely illustrative ones and are not used to limit the invention. The purposes of the invention are completely and effectively fulfilled. The functions and structural principles of the invention have been illustrated and described in the above embodiments, and any transformations or amendments can be made to the above embodiments of the invention without departing from the principle of the invention.

What is claimed is:

1. A four wire-to-two wire lamp control method, comprising:

- S1: inputting R (red), G (green) and B (blue) lamp control signals in a four-wire system to three corresponding oscillators respectively, and controlling the oscillators to generate R, G and B oscillation signals respectively, wherein oscillation frequencies of the three oscillators are different and are all higher than frequencies of the R, G or B lamp control signals;
- S2: amplifying the R, G and B oscillation signals to obtain amplified R, G and B oscillation signals which are coupled into a composite signal;
- S3: integrating electric power of the R, G, B lamp control signals with electric power of a driving circuit in the four-wire system to obtain integrated electric power;
- S4: superposing the composite signal onto the integrated electric power to obtain composite electric power that is transmitted by a two-wire system;
- S5: receiving the composite electric power from the two-wire system, and performing signal-power separation on the composite electric power to obtain driving electric power for driving a lamp, and the composite signal;
- S6: the composite signal sequentially passing through three LC (Inductor-Capacitor) frequency selection circuits to be restored into the amplified R, G and B oscillation signals, wherein preset frequency selection ranges of the three LC frequency selection circuits match the oscillation frequencies of the oscillators respectively; and
- S7: demodulating the amplified R, G and B oscillation signals to respectively obtain the R, G and B lamp control signals for controlling a corresponding R-LED (Light-Emitting Diode) lamp bank, G-LED lamp bank and B-LED lamp bank in the lamp.

2. The four wire-to-two wire lamp control method according to claim 1, wherein in S2, the R, G and B oscillation signals are coupled by capacitive coupling or transformer coupling.

3. The four wire-to-two wire lamp control method according to claim 1, wherein before S1, the four wire-to-two wire lamp control method further comprises S0: respectively detecting states of the R, G and B lamp control signals input to the three corresponding oscillators from the four-wire system, and controlling the oscillators to which the R, G and B lamp control signals are input to start to oscillate or stop oscillating based on the states of the R, G and B lamp control signals.

4. A four wire-to-two wire lamp control system, comprising a four-wire system input module, an oscillation starting and stopping module, a power integration module, a signal coupling module, a signal superposition module, a two-wire system transmission module and an analysis module; wherein,

- the four-wire system input module is connected to an input terminal of the power integration module by means of a first positive wire, an R signal wire, a G signal wire and a B signal wire; an output terminal of the power integration module is sequentially connected to the signal superposition module and the two-wire system transmission module by means of a second first positive wire and a first negative wire; a composite output terminal of the two-wire system transmission module is connected to a composite input terminal of the analysis module by means of a signal wire and a second negative wire, a composite output terminal of the analysis module is connected to a lamp;
- the oscillation starting and stopping module comprises three oscillators, input terminals of the three oscillators are connected to the R signal wire, the G signal wire and the B signal wire respectively, output terminals of the three oscillators are all connected to the signal coupling module, and an output terminal of the signal coupling module is connected to the signal superposition module;
- the four-wire system input module is configured for generating R (red), G (green) and B (blue) lamp control signals and outputting the R, G and B lamp control signals to corresponding oscillators by means of the R signal wire, the G signal wire and the B signal wire respectively;
- the oscillators are configured for correspondingly receiving the R, G and B lamp control signals and generating R, G and B oscillation signals, wherein oscillation frequencies of the three oscillators are different and are all higher than frequencies of the input R, G or B lamp control signals;
- the signal coupling module is configured for coupling the three oscillation signals into a composite signal and transmitting the composite signal to the signal superposition module;
- the power integration module is configured for integrating electric power of the R, G and B lamp control signals with electric power of a driving circuit to obtain integrated electric power;
- the signal superposition module is configured for superposing the composite signal onto the integrated electric power to obtain composite electric power and outputting the composite electric power to the two-wire system transmission module;
- the two-wire system transmission module comprises a third positive wire connected to the second positive wire and a third negative wire connected to the first negative wire, and is configured for transmitting the composite electric power and outputting the composite electric power to the analysis module;

the analysis module comprises a signal-power separation unit, a frequency selection circuit unit and a demodulation unit; the signal-power separation unit is configured for receiving the composite electric power and performing signal-power separation on the composite electric power to obtain driving power for driving a lamp, and the composite signal;

the frequency selection circuit unit comprises three LC frequency selection circuits corresponding to the oscillators, the demodulation unit comprises three demodulators, the lamp comprises an R-LED lamp bank, a G-LED lamp bank and a B-LED lamp bank, the three LC frequency selection circuits are connected in sequence, and output terminals of the three LC frequency selection circuits are electrically connected to the R-LED lamp bank, the G-LED lamp bank and the B-LED lamp bank by means of the demodulators respectively; and the composite signal sequentially passes through the three LC frequency selection circuits for frequency selection such that the composite signal are restored to the R, G and B oscillation signals; the demodulators are configured to demodulate the R, G and B oscillation signals input thereto to obtain the R, G and B lamp control signals to control the R-LED lamp bank, the G-LED lamp bank and the B-LED lamp bank of the lamp respectively; wherein preset frequency selection ranges of the three LC frequency selection circuits match the frequencies of the oscillators respectively.

5. The four wire-to-two wire lamp control system according to claim 4, further comprising a signal amplification module, wherein the signal amplification module comprises three signal amplifiers, input terminals of the signal amplifiers are respectively connected to the oscillators in one-to-one correspondence, and output terminals of the signal amplifiers are all connected to an input terminal of the signal coupling module.

6. The four wire-to-two wire lamp control system according to claim 4, wherein the oscillation starting and stopping module further comprises a micro controller unit (MCU) and switching devices in one-to-one correspondence with the oscillators, input terminals of the MCU are connected to the R signal wire, the G signal wire and the B signal wire respectively, and output terminals of the MCU are connected to the switching devices in one-to-one correspondence; the input terminals of the three oscillators are connected to the R signal wire, the G signal wire and the B signal wire in one-to-one correspondence by means of the switching devices respectively; and the MCU is configured to detect whether the R, G and B lamp control signals are output by the R signal wire, the G signal wire and the B signal wire and control the switching devices to be turned on or off according to detection results to thereby control the oscillators to start to oscillate or stop oscillating.

* * * * *